No. 777,024.

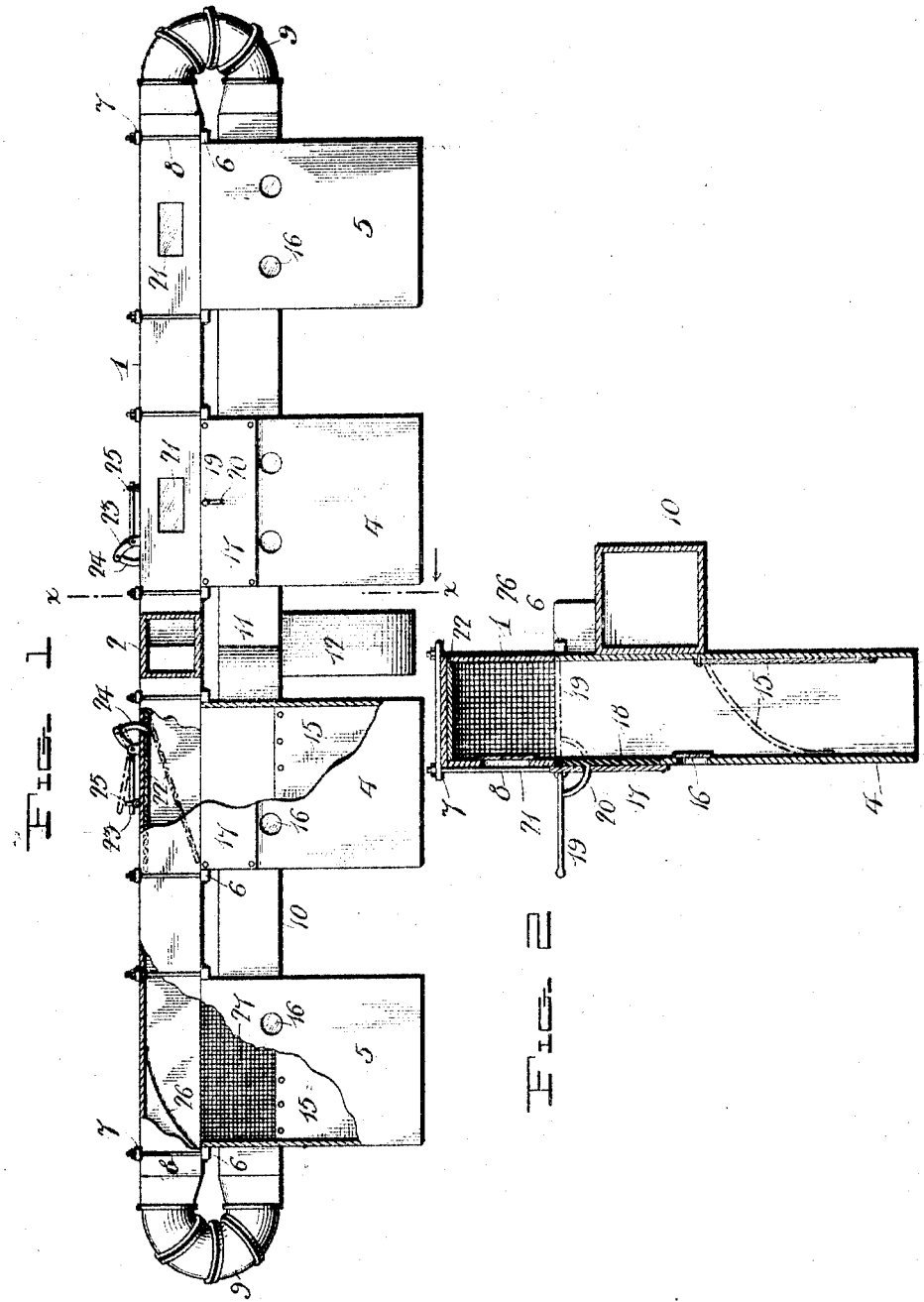

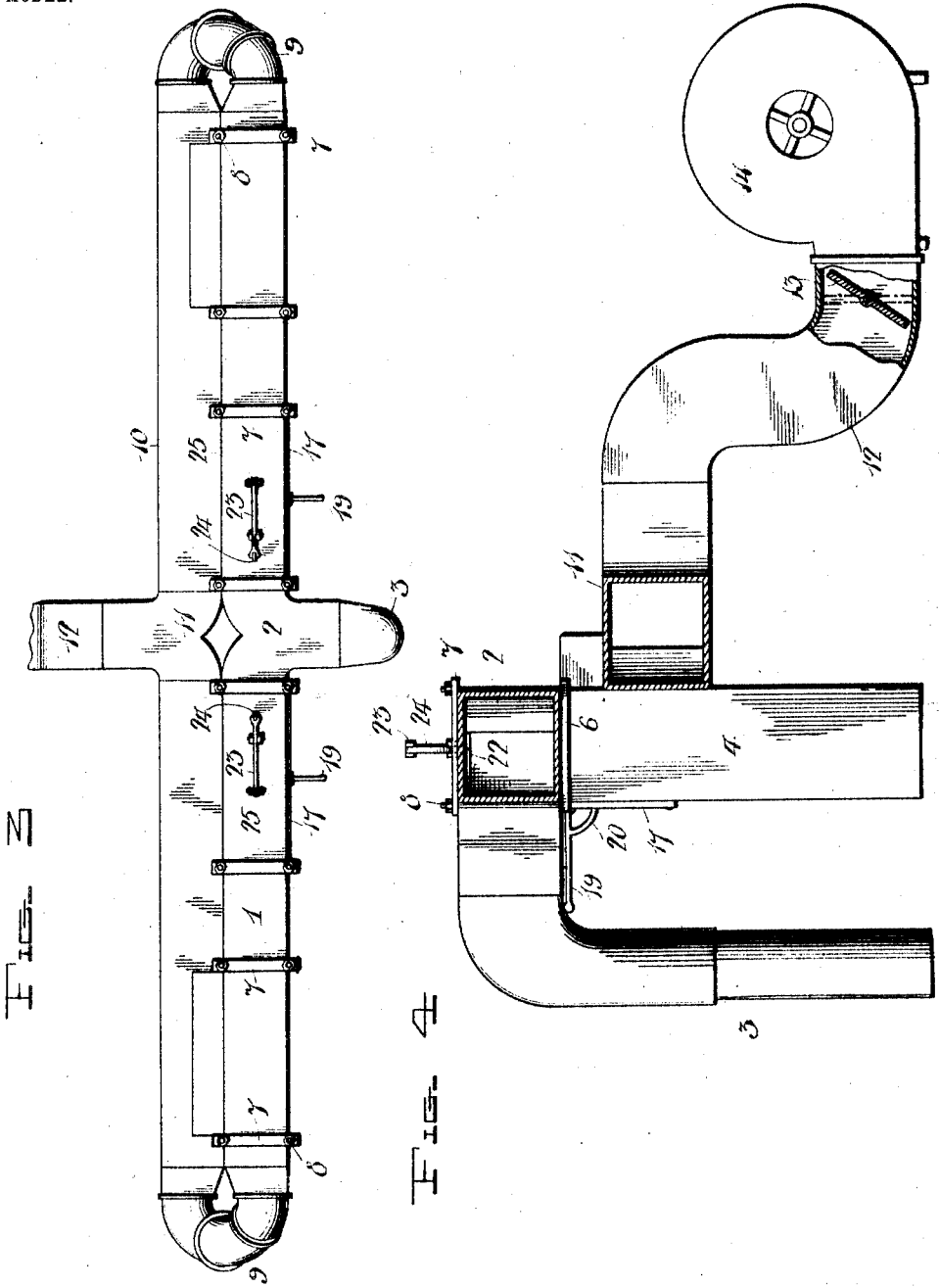

Patented December 6, 1904.

UNITED STATES PATENT OFFICE.

JAMES THEODORE JACKSON, OF CORSICANA, TEXAS.

PNEUMATIC COTTON ELEVATOR AND DISTRIBUTER.

SPECIFICATION forming part of Letters Patent No. 777,024, dated December 6, 1904.

Application filed May 9, 1903. Serial No. 156,433. (No model.)

*To all whom it may concern:*

Be it known that I, JAMES THEODORE JACKSON, a citizen of the United States, residing at Corsicana, in the county of Navarro and State of Texas, have invented certain new and useful Improvements in Pneumatic Cotton Elevators and Distributers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to pneumatic cotton elevators and distributers usually employed as gin-feeders, and has for its object the production of a special arrangement of the customary elements — gin-boxes, cotton-flues, screens, and air-flue — designed to reduce the resistance and friction of the moving air to a minimum, correspondingly lessening the power needed to drive the exhaust-fan.

I accomplish the object stated by means of the parts and their association illustrated in the accompanying drawings, of which—

Figure 1 is a front view of a row of gin-boxes, showing the position of the cotton and air chutes with respect to each other and to the gin-boxes, a portion of the front of two gin-boxes being cut away to exhibit the internal arrangement. Fig. 2 represents a vertical cross-section of one of the intermediate gin-boxes. Fig. 3 is a plan view from above. Fig. 4 is a vertical sectional view on the line *x x* of Fig. 1 looking toward the left hand and showing the telescopic cotton intake or sucker pipe leading to the cotton-flue and the fan connection from the air-flue.

Like numbers refer to like parts in the several views.

Numeral 1 marks the cotton-flue. It is composed of two branches leading to right and left in direct lines from the Y, (designated 2, see Fig. 3,) wherein the two branches combine and connect with the intake or telescopic elevator pipe 3, (see Fig. 4,) which may be introduced into a wagon or bin to take in the cotton in the usual manner.

Attached to the cotton-flue 1 at intervals are the gin-boxes, those intermediately placed being referred to by numeral 4, and those situated at the opposite ends of the series are designated by numeral 5. One method ordinarily employed of attaching the gin-boxes to the cotton-flue is to secure the cleats 6 transversely at the top edge of each side and to place a bar 7 across the top of the cotton-flue and pass clamping-bolts 8 through corresponding ends of the bars and cleats. In that way the gin-boxes are firmly fixed at the proper points along the cotton-flue, and while they can be readily removed for cleaning or repairs they cannot become accidentally detached or displaced.

At the opposite outermost extremities the branches of cotton-flue 1 are suitably coupled to the return-bends 9, which curve through one hundred and eighty degrees and are joined at a lower point to the air-flue 10. It will be noted that the air-flue 10 is also composed of two branches which parallel those of the cotton-flue and are combined at a middle point in the Y 11, which is connected with the fan-pipe 12, that includes the cut-off valve 13 and terminates in the fan 14.

Each gin-box, those at the ends as well as those intermediately located, is provided with a flexible sheet-valve 15, as is customary, and observation-apertures 16, the latter suitably glazed, and each gin-box opens to its full extent at the top into the cotton-flue 1. (See Fig. 2 and Fig. 1.) Each intermediate gin-box is provided with an extra board 17, attached on the outside of its front, and a damper-board 18, hinged at its upper edge, is normally in a position against the inner surface of the extra board 17 and flush with the inside surface of the gin-box, which is thus preserved evenly and offers no lodging-place for the cotton passing down the gin-box. By means of the lever 19, fulcrumed on the outside of the gin-box, and the arc 20, connected with the lever and damper 18, the latter can be raised into a horizontal position, in which it is flush with the bottom of the cotton-flue 1 and completely cuts out the gin-box, rendering the cotton-flue continuous and smooth for the passage of cotton to gin-boxes beyond.

Over each gin-box the cotton-flue 1 is provided with an observation-glass 21.

In Fig. 1 will be noted the pivoted screens 22, upheld normally against the top of the cotton-flue. Only the intermediate gin-boxes are furnished with the pivoted screens 22. They are operated by the levers 23, fulcrumed exteriorly on the top of the cotton-flue and the arc 24, attached to the lever and screen, as shown. When the screens are raised, the handle of the lever is held by a pivoted link 25, caused to engage it, and when the link is disengaged the end of the pivoted screen which is farthest from the two Y-shaped elements drops upon the edge of the cotton-gin box. For example, let it be desired for any reason to cut out the left-hand-end gin-box 5, the pivoted screen 22 of gin-box 4 next to that end would be dropped and the cotton diverted downwardly into the gin-box 4 instead of passing onward into the end gin-box, as before. On the other hand, let it be assumed that the intermediate gin-box 4 next to the left-hand-end gin-box (or any other intermediate gin-box) is to be cut out. This condition is attained by raising the damper 18 by lever 19 and arc 20, leaving the cotton-flue 1 interiorly smooth to the end gin-box 5. I do not confine myself to any particular devices for operating the dampers and pivoted screens.

In order to direct the cotton downwardly into the end gin-boxes 5, the downwardly-curving screens 26 are permanently fixed in the positions shown in Fig. 1. It occasionally occurs that these curved fixed screens 26 become obstructed by catching the cotton and would therefore interfere with the flow of air. To avoid such a contingency, I place in each end gin-box 5 the rear fixed screen 27, and if the air-current is hindered by filling of the screens 26 it finds its way to the air-flue 10 through the rear screens 27.

When the suction is created by the fan in the usual way, the flexible sheet-valves rise and partition the interiors of the gin-boxes against inflow of outside air, and the cotton from the cotton-flue is deposited upon the sheet-valves until such a time as it is desired to clear them, whereupon the fan is stopped or cut out and the back rush of air to fill the partial exhaustion clears the screens and permits the sheet-valves to drop, depositing their accumulations of cotton into the feed-boxes of the gins or other receptacles. By using the return-bends having considerable radius of curvature and by arranging the cut-out dampers, when used flush, with the surface of the cotton-flue bottom I afford the air-current practically an uninterrupted passage interposing the least resistance and calling for but little operating power.

I am aware that pneumatic gin-feeders have been constructed operated by suction and delivering the cotton both ways from a middle point and employing certain parts also used by me, and I do not claim that construction or those parts broadly.

What I claim, and desire to secure by Letters Patent of the United States, is—

1. In a pneumatic cotton elevator and distributer, the combination with a cotton-flue, of an air-flue, intermediate gin-boxes opening into the cotton-flue and permanently closed to said air-flue, end gin-boxes opening into the cotton-flue, and return-bends consisting of curved pipes joining said flues beyond said end boxes whereby the movement of air is reversed in direction without abrupt changes, substantially as described.

2. In a pneumatic cotton elevator and distributer, the combination with a cotton-flue, of an air-flue, intermediate gin-boxes opening into the cotton-flue and permanently closed to said air-flue, end gin-boxes opening into said cotton-flue and into said air-flue, and return-bends consisting of curved pipes joining said flues beyond said end boxes whereby the movement of air is reversed in direction without abrupt changes, substantially as described.

3. In a pneumatic cotton elevator and distributer, the combination with a cotton-flue, of an air-flue, intermediate gin-boxes opening into the cotton-flue, end gin-boxes opening into the cotton-flue, and return-bends consisting of curved pipes joining said flues beyond said end boxes whereby the movement of air is reversed in direction without abrupt changes, substantially as described.

In testimony whereof I affix my signature in presence of two witnesses.

JAMES THEODORE JACKSON.

Witnesses:
J. M. HOSKINS,
D. K. McCAMMON.